United States Patent [19]
Johnston

[11] Patent Number: 5,787,582
[45] Date of Patent: Aug. 4, 1998

[54] METHOD FOR MAKING CROSS-CONNECT BUS

[75] Inventor: James J. Johnston, Newington, Conn.

[73] Assignee: The Wiremold Company, West Hartford, Conn.

[21] Appl. No.: 775,832

[22] Filed: Dec. 31, 1996

Related U.S. Application Data

[62] Division of Ser. No. 381,713, Jan. 31, 1995, Pat. No. 5,624,267.

[51] Int. Cl.$^6$ .................................................. H05K 13/00
[52] U.S. Cl. .................................................. 29/854
[58] Field of Search .................... 29/884, 882, 622; 439/922, 404, 507, 54, 709

[56] References Cited

U.S. PATENT DOCUMENTS 4,490,903 1/1985 Agatahama .................... 29/622

*Primary Examiner*—Carl E. Hall
*Assistant Examiner*—Christopher Goins
*Attorney, Agent, or Firm*—McCormick, Paulding & Huber

[57] ABSTRACT

A cross-connect bus for plugging engagement with a cross-connect panel having a plurality of rows of projecting insulation displacement connectors includes first and second rectilinear axially extending resilient spring wire contact elements having outer end portions supported in fixed positions and in coaxial alignment with each other by spaced apart receptacles defined by a common support base. The inner end portions of the contact elements are supported in cantilever position by the outer end portions and have overlapping free ends biased into electrical contacting engagement with each other. Plugging elements cooperate with the support base to disable, monitor or test circuits completed by the cross-connect bus without removing the bus from plugging engagement with an associated cross-connect panel. The bus is made by mounting opposite end portions of a rectilinear axially elongate spring wire conductor in fixed positions of coaxial alignment on a common support base, severing the conductor to form two contact elements including inner end portions supported in cantilever positions by the opposite end portions and having free ends, deflecting the inner end portions in an axially transverse direction relative to each other to move the free ends out of alignment with each other, and moving the contact elements relative to each other to bring the free ends into overlapping relation while the inner end portions are deflected.

6 Claims, 5 Drawing Sheets

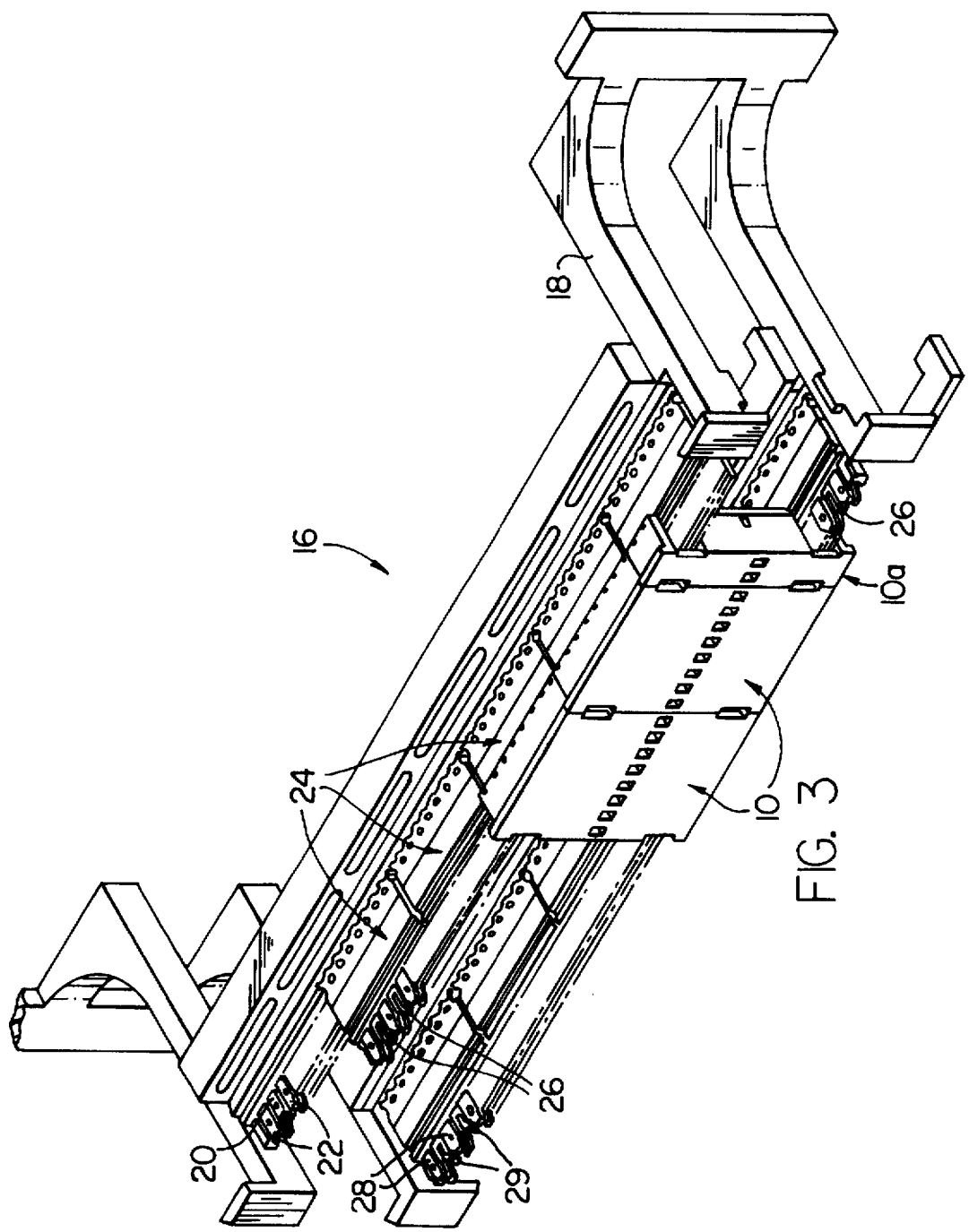

5,787,582

METHOD FOR MAKING CROSS-CONNECT BUS

This is a division of application Ser. No. 08/381,713 filed on Jan. 31, 1995 U.S. Pat. No. 5,624,267.

BACKGROUND OF THE INVENTION

This invention relates in general to telecommunication equipment and deals more particularly with a cross-connect bus for use on a cross-connect panel and a method for making such a bus.

The cross-connect bus of the present invention is particularly adapted for connection to a cross-connect panel, such as an AT&T 110 type panel, to establish desired circuit paths at the panel. Such a cross-connect panel provides a convenient centralized location for networking the communications and data processing systems within a building and for interconnecting the systems with an outside telecommunications network.

In most modern cross-connect panel systems, patch cords are employed at the panel to establish the various required circuits. A typical patch cord includes a flexible stranded wire cord with a patch plug attached to each end. Each patch plug generally has a housing containing an in-line array of flat contact blades adapted to be simultaneously pressed or plugged into and extracted from an equal number of mating insulation displacement contacts (IDCs) mounted on and projecting from an associated cross-connect panel. Typically, the contact blades within each patch plug housing are connected to individual stranded wire conductors in the patch cord by IDC terminations. Such stranded wire patch cords afford considerable flexibility, for ease of cable buildup during panel board installation, but are relatively expensive to produce, occupy considerable space and often present a generally confused wiring pattern at the panel. When it is necessary to interrupt or test a circuit at the cross-connect panel the patch cord associated with that circuit must be unplugged. This procedure may result in interruption of several other active circuits connected by the same patch cord. Further, repeated plugging and unplugging of patch cords adversely effects the integrity of the IDC connections and may ultimately lead to circuit failures at the cross-connect panel.

Accordingly, it is the general aim of the present invention to provide a compact low cost cross-connect bus for completing circuits at a cross-connect panel. It is a further aim of the invention to provide a cross-connect bus which facilitates interrupting or opening a desired circuit at a cross-connect panel, maintaining the circuit in open condition, testing both the upstream and downstream portions of a circuit or placing a tap on a circuit without removing the cross-connect bus associated with the circuit from the cross-connect panel.

SUMMARY OF THE INVENTION

A cross-connect bus for plugging connection to a cross-connect panel having a plurality of parallel rows of insulation displacement contacts. The cross-connect bus comprises first and second rectilinear axially extending spring wire contact elements which have outer end portions and inner end portions. The cross-connect bus further includes supporting means for retaining the outer end portions of the first and second contact members in coaxial alignment with each other for plugging engagement with the insulation displacement contacts in two of the parallel rows. The outer end portions support the inner end portions of the first and second contact elements in cantilever positions. The inner end portions having free ends disposed in overlapping relation and biased into electrical contacting engagement with each other. The bus connector is made by securing opposite end portions of a rectilinear axially elongate resilient spring wire conductor to spaced apart receptacles defined by a common support base, severing the spring wire conductor intermediate the receptacles and in spaced relation to each of the receptacles to form from the conductor two separate cantilever spring wire contact elements having a free end portion, deflecting the free end portions in an axially transverse direction relative to each other and out of coaxial alignment, moving at least one of the contact elements in an axial direction relative to its associated supporting receptacle and toward the other of the contact elements while the free end portions are deflected out of coaxial alignment with each other to establish overlapping relationship between the free end portions, and releasing the deflecting force after overlapping relationship of the free end portions has been established.

BRIEF DESCRIPTION OF THE DRAWINGS

FIG. 3 is a perspective view of a typical cross-connect panel having a plurality of parallel rows of insulation of placement connectors and shown with two cross-connect buses embodying the present invention connected thereto.

DETAILED DESCRIPTION OF PREFERRED EMBODIMENT AND METHOD

Figure 1:
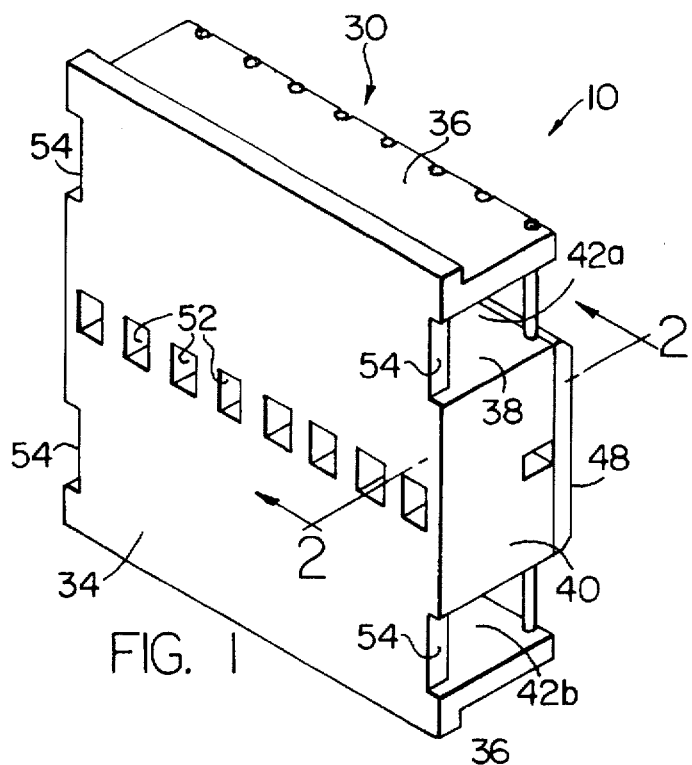
FIG. 1 is a perspective view of a cross-connect bus embodying the present invention.
Figure 2:
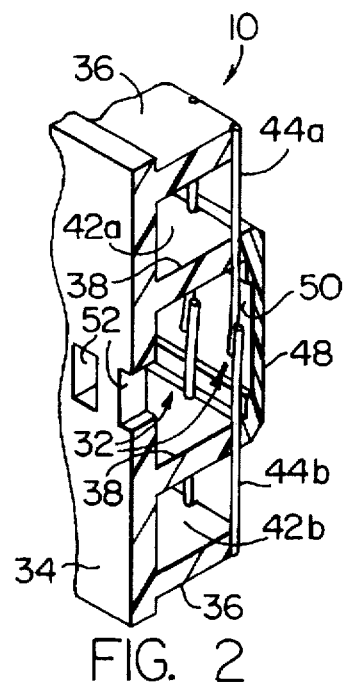
FIG. 2 is a fragmentary sectional view taken along the line 2—2 of FIG. 1.

Turning now to the drawings, a cross-connect bus embodying the present invention and made in accordance with the invention is shown in FIGS. 1 and 2 and indicated generally by the reference numeral 10. The illustrated cross-connect bus 10 is an electrical switching device particularly adapted for connection to a cross-connect panel of a well known type usually found in large office buildings and other commercial establishments for networking the communications and data processing systems within a building and interconnecting those systems with an outside telecommunication network. The cross-connect bus 10 is used to interconnect wire conductors terminated at such a cross-connect panel which is hereinafter more fully described.

FIG. 3 illustrates a typical wall mounted cross-connect panel of a type with which the cross-connect bus 10 is used. The illustrated panel, indicated generally by the numeral 16, is an AT&T 110 cross-connect panel (110 AWI-100) and includes a frame 18 molded from dielectric plastic material. A plurality of parallel rows of spaced apart first plugging elements 20, 20 and 22, 22 project forwardly from the frame. The end portions of individual wire conductors to be interconnected at the cross-connect panel 16 are received in the spaces between the first plugging elements 20, 20 and 22, 22 and terminated by connector blocks of a well known type, indicated generally at 24, 24 and which carry double ended IDC connectors and snap into lock-on engagement with the frame 18.

Figure 4:
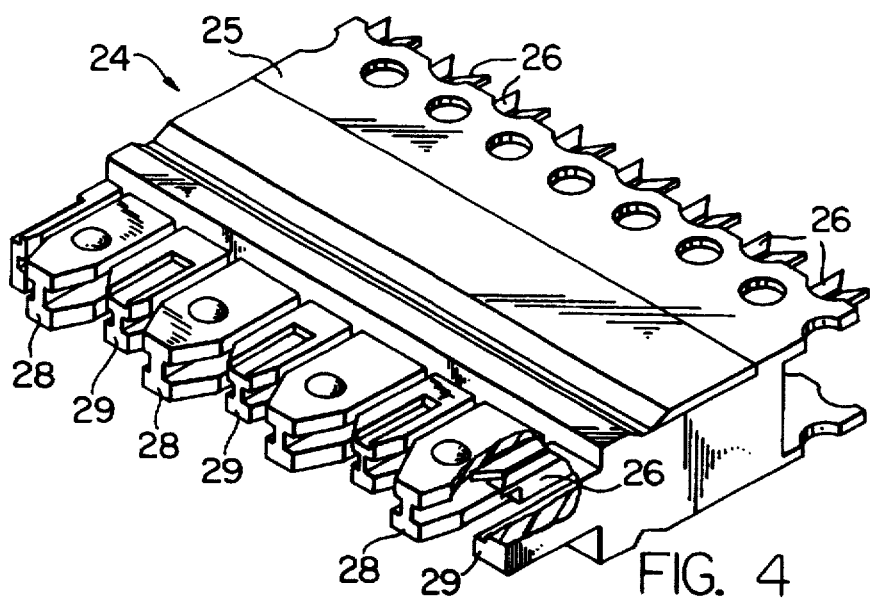
FIG. 4 is a somewhat enlarge perspective view of a typical connector block.
Figure 5:
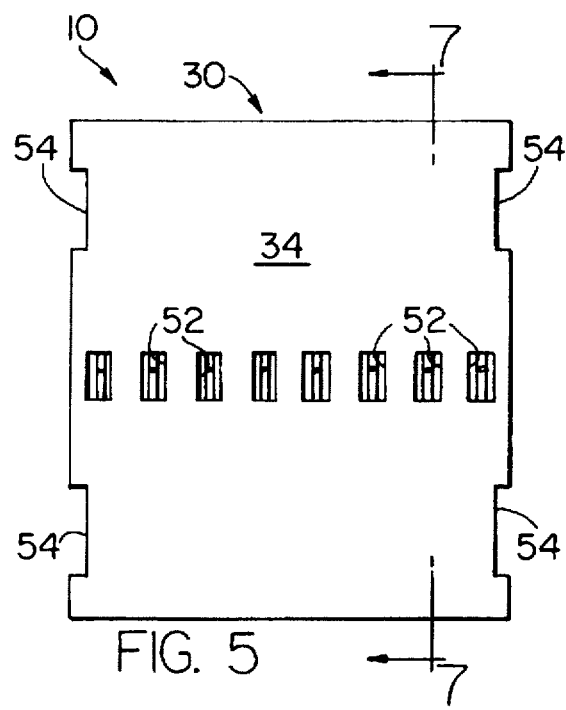
FIG. 5 is a front elevational view of the cross-connect bus of FIGS. 1 and 2.

A typical connector block 24, shown in FIG. 4, has a dielectric body 25 and carries an in-line array of double ended connector elements 26, 26. Each connector element 26 has insulation displacement connectors (IDCs) at its opposite ends. The IDCs at the rear of the connector elements 26, 26 project from the rear or frame engaging side of the connector block 24 and simultaneously terminate an in-line array of individual wire conductors positioned in the spaces between associated plugging elements 20, 20 and 22, 22 carried by the frame 18 when the connector block 24 is snapped into locking engagement with the frame. The IDCs at the opposite or front end of the connector elements 26, 26 are alternately arranged in spaces between second plugging elements 28, 28 and 29, 29 integrally formed on the front end of the connector block body 25.

The illustrated cross-connect bus 10 is particularly adapted to interconnect IDCs exposed at the front ends of connector blocks 24, 24 in one row on the panel 16 with IDCs exposed at the front ends of connector blocks 24, 24 in an immediately adjacent parallel row, therefore, when the panel 16 is installed incoming and outgoing pairs of wire conductors to be interconnected at the panel will be terminated by IDCs associated with connector blocks 24, 24 in an immediately adjacent rows on the panel.

Considering now the cross-connect bus of the present invention in further detail and as oriented in FIGS. 1 and 2 and 5–8, the illustrated cross-connect bus 10 essentially comprises a unitary support member or base indicated generally by the reference numeral 30 and a plurality of sets of resilient spring wire contact elements mounted on the support base and indicated generally by the numerals 32, 32.

Figures 6, 7:
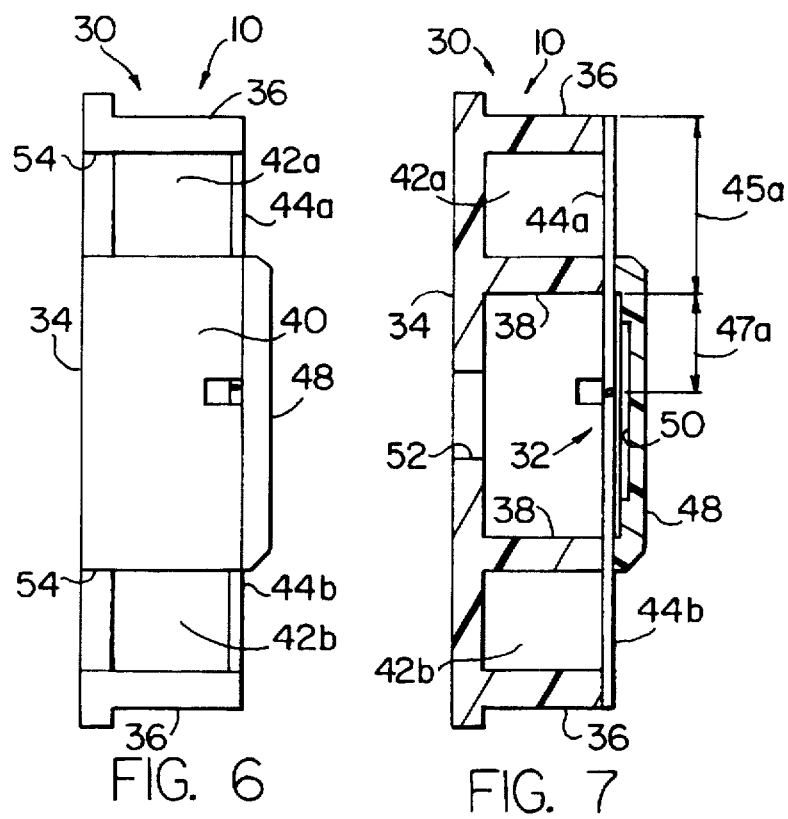
FIG. 6 is a somewhat enlarged side elevational view of the cross-connect bus.
FIG. 7 is a sectional view taken along the line 7—7 of FIG. 5.

The support member 30 is preferably molded from durable dielectric plastic material and has a generally rectangular front wall 34. A pair of generally rectangular upper and lower outer end walls 36, 36 project rearwardly from the upper and lower ends of the front wall 34 in parallel relation to each other as shown in FIGS. 6 and 7. A pair of generally rectangular upper and lower inner end walls 38, 38 spaced inwardly from the outer end walls 36, 36 project rearwardly from the front wall in parallel relation to the outer end walls 36, 36. Sidewalls 40, 40 project rearwardly from the front wall and extend between and connect the opposite ends of the inner end walls 38, 38. Each outer end wall 36 cooperates with an associated inner end wall 38 and a portion of the front wall 34 to define a longitudinally extending rearwardly open receptacle. The resulting two elongate receptacles, located at the upper and lower ends of the bus 10 and indicated at 42a and 42b, respectively, are spaced apart an appropriate distance to receive the plugging elements and IDCs on associated connector blocks 24, 24 mounted in immediately adjacent rows on the cross-connect panel 16.

The number of sets of contact members 32, 32 mounted on the support base 30 may vary. However, the illustrated cross-connect bus 10 is particularly adapted to connect four incoming pairs of wire conductors to four outgoing pairs of wire conductors terminated at the cross-connect panel 16, as shown in FIG. 3, and carries eight sets of contact elements 32, 32. Another cross-connect bus which connects a single pair of terminated conductors is also shown mounted on the panel 16 and is indicated at 10a in FIG. 3.

Figure 8:
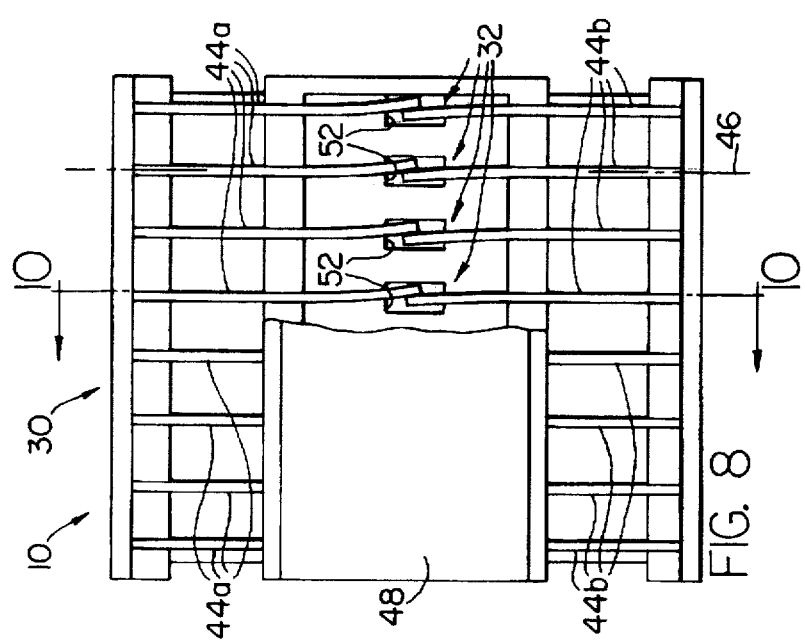
FIG. 8 is a somewhat enlarged rear elevational view of the cross-connect bus.

Each set of contact elements 32 includes first and second resilient spring wire contact elements designated 44a and 44b, respectively. Preferably, and as shown, the contact elements 44a and 44b are substantially identical and have a uniform circular cross-section. A typical first contact element 44a, shown in FIG. 7, has an outer end portion indicated at 45a and an inner end portion indicated at 47a. The outer end portion 45a is mounted in fixed position on the upper outer end wall 36 and the upper inner end wall 38 in bridging relation to the upper receptacle 42a defined by the latter two walls for plugging engagement with an associated IDC carried by a connector block 24 in one row on the cross-connect panel 16. In like manner, the outer end portion of the second contact element 44b is mounted on the lower outer end wall 36 and the lower inner end wall 38 and in bridging relation to the lower receptacle 42b for plugging engagement with an IDC carried by a connector block 24 in another row immediately adjacent the one row. The outer end portions of the contact elements 44a and 44b in each set 32 are coaxial aligned with each other along a common axis, as best shown in FIG. 8 wherein the axis of a typical contact set 32 is indicated by the numeral 46. The inner end portions of the contact elements in each set 32 are supported in cantilever positions by the outer end portions and extend inwardly toward each other terminating at free ends disposed in overlapping relationship and biased into electrical contacting engagement with each other as, best shown in FIG. 8, for a purpose which will be hereinafter evident.

Preferably, and as best shown in FIGS. 1, 2, 7 and 8 a cap 48 is mounted on the rear of the support base 30 and comprises a part of the support base. The cap 48 is ultrasonically welded or otherwise suitably attached to the rearwardly facing surfaces of the inner end walls 38, 38 and the sidewalls 40, 40 and forms a protective cover for the overlapping free ends of the contact sets 32, 32. Preferably, and as shown, the cap closely overlies parts of the contact elements 44a and 44b supported by the inner end walls 38, 38 and stabilizes the contact elements at these mounting points. A shallow forwardly open recess 50 in the front side of the cap 48 provides clearance for the free ends of the contact sets 32, 32 to permit rearward movement of the free ends. A laterally extending series of rectangular apertures 52, 52 equal in number to the contact sets 32, 32 open through a central portion of the front wall 34. Each aperture 52 is disposed in general registry with the overlapping free inner end portions of an associated one of said contact sets 32, 32, as best shown in FIG. 8. Outwardly open notches 54, 54 at opposite sides of the front wall 34 aid in removing the bus 10 from connected engagement with the panel 16 when an array of buses 10, 10 are mounted on an associated cross-connect panel 16 in immediately adjacent side-by-side relation to each other. The notches 54, 54 are sized to receive the tip of a tool, such as a screwdriver, which may be used to pry a bus 10 out of plugging engagement with the panel 16 without first removing at least one of the adjacent buses from the panel.

A tip and ring circuit completed at the cross-connect panel 16 an associated bus 10 may be disabled or opened at the panel while the aforesaid bus 10 remains connected to the panel. Further both the upstream and downstream sides of the tip and ring circuit may be tested at the panel without removing the bus. The aforesaid circuit may also be monitored at the panel without disturbing the connections between the cross-connect bus 10 and the associated IDCs on the cross-connect panel into which the bus is plugged. Plugging elements which cooperate with the support base 30 facilitate the aforesaid circuit interruption, circuit test and circuit monitoring functions.

Figure 9:
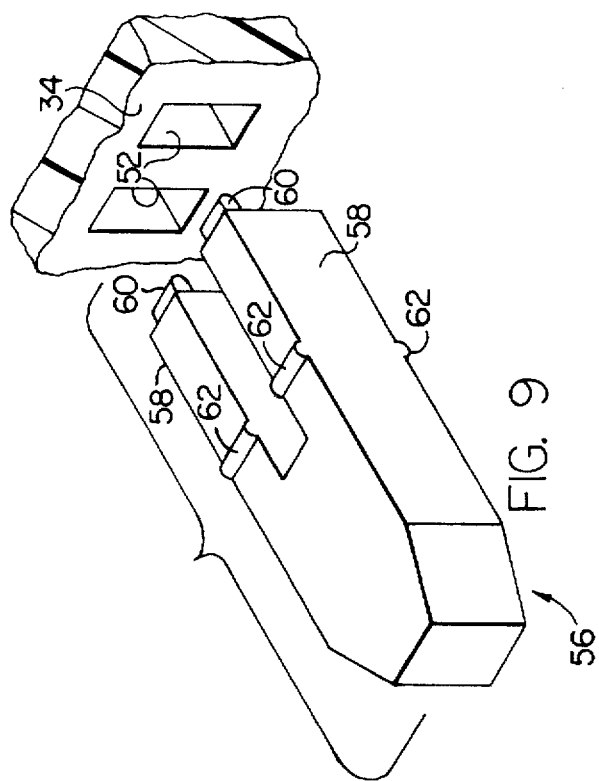
FIG. 9 is a perspective view of a typical plugging element for maintaining an open circuit condition shown in plugging relation to a cross-connect bus.
Figure 11:
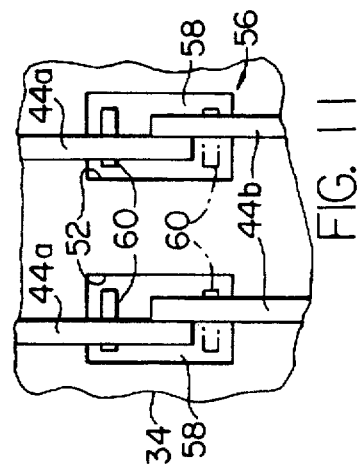
FIG. 11 is a somewhat enlarged fragmentary sectional view taken along the line 11—11- of FIG. 10.
Figure 10:
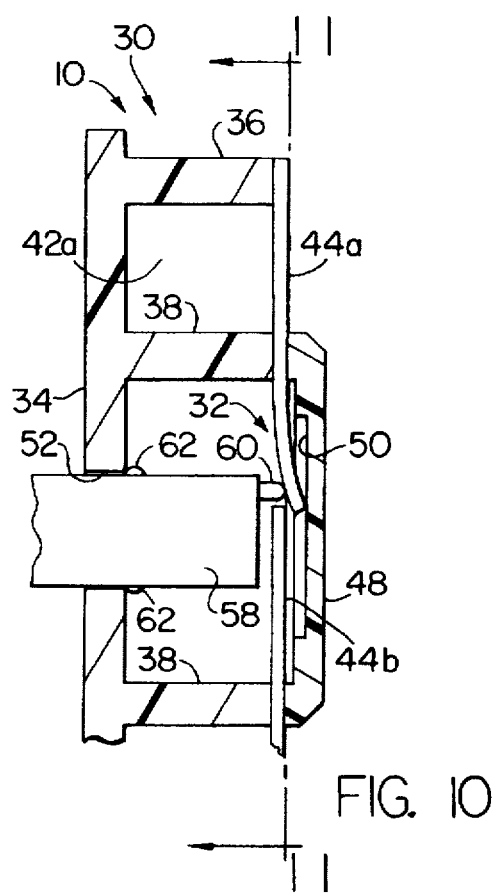
FIG. 10 is a fragmentary sectional view taken along the line 10—10 of FIG. 8 and shows the cross-connect panel with the plugging element of FIG. 9 plugged therein.

A typical plugging element shown in FIGS. 9–11 and indicated generally by the reference numeral 56 has a pair of spaced apart legs 58, 58 sized for insertion into a pair of adjacent apertures 52, 52 in the front wall 34. Each leg 58 has a probe 60 at its free end. The probes 60, 60 are positioned on the legs 58, 58 to engage inner end portions of a pair of first contact elements 44a, 44a and deflect the free end portions thereof out of electrical contacting engagement with the free end portions of the second contact elements 44b, 44b associated therewith, as best shown in FIG. 10, when the plugging element 56 is inserted into an associated pair of adjacent apertures 52, 52 in one position of insertion. When the plugging element 56 is inserted into the bus 10 in a reverse position the inner free end portions of the second contact elements 44b, 44b are deflected out of electrical contacting engagement with the free end portions of the first contact elements 44a, 44a as shown in FIG. 11 where the second position of the probes 60, 60 are shown in broken lines. Thus, the plugging element 56 is bidirectional so that insertion of the plugging element into the cross-connect bus 10 in either of two possible positions of insertion operates the switch formed by the first and second pair of contact elements to open the circuit through the cross-connect bus 10. The legs 58, 58 are preferably sized for frictional engagement with the front wall 34 within the apertures 52, 52 whereby the plugging element is releasably retained within the bus 10 to maintain the circuit in open condition. Alternatively, a more positive means for releasably retaining the plugging element 56 may be provided, as, for example, ribs 62, 62 on the plugging element, for snap-in engagement with the front wall 34. The circuit remains in disabled condition until the plugging element 56 is removed from the bus 10.

Figure 12:
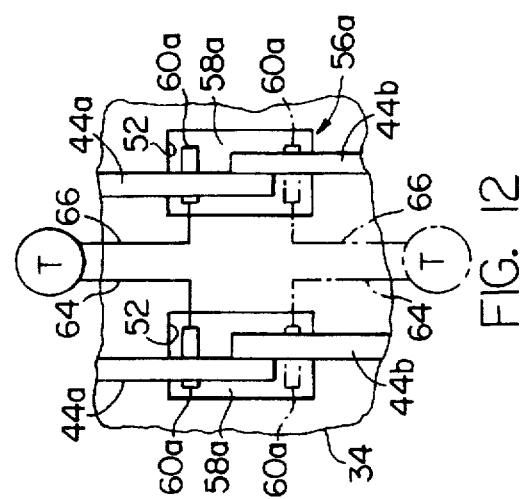
FIG. 12 is similar to FIG. 11 but shows another plugging element.

In FIG. 12 there is shown another plugging element or test probe 56a for testing either the upstream or downstream side of a tip and ring circuit completed by a cross-connect bus 10. The plugging element 56a is identical in most respects to the plugging element 56 previously described but differs from it in that separate flexible wire conductors 64 and 66 are respectively connected to each of the probes 60a, 60a. The opposite ends of the wire conductors 64 and 66 are connected to an appropriate associated test instrument indicated by the letter T. Thus, when the test probe or plug 56a is inserted into the cross-connect bus 10 in one position of insertion the circuit between the pair of first contact elements 44a, 44a and the pair of second contact elements 44b, 44b is opened and electrical contact is simultaneously established with each of the first contact elements 44a, 44a which may, for example, comprise the downstream or source side of the circuit, so that the condition of that side of the circuit may be determined. When the position of the plugging element 56a is reversed with respect to the bus 10 the circuit is opened by the probes 60a, 60a but electrical contact is established between each probe 60a and an associated one of the second contact elements 44b so that the condition of the upstream or load side of the circuit may be determined without removing the bus 10 from plugging engagement with the cross-connect panel 16.

Figure 13:
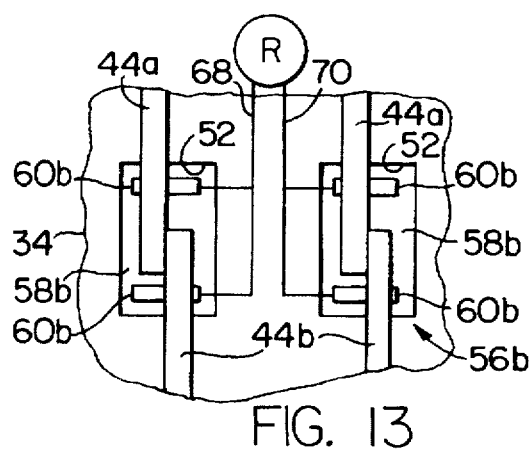
FIG. 13 is similar to FIG. 11 but shows still another plugging element.

A third plugging or testing element for monitoring a circuit completed by a cross-connect bus 10 is illustrated in FIG. 13 and indicated generally by the reference numeral 56b. Like the previously described plugging elements 56 and 56a the plugging element 56b has two legs 58b, 58b for insertion into adjacent apertures 52, 52 in the front wall 34. However, each leg 58b carries two probes 60b, 60b, one for engaging the inner end portion of an associated first contact element 44a and the other for engaging the inner end portion of an associated second contact element 44b. The two probes 60b, 60b on each leg are connected together and to an associated electrical conductor in a flexible line cord attached to the plugging element 56b. The two conductors 68 and 70 which comprise the line cord are, in turn, connected to an associated monitoring device, as, for example, a tape recorder indicated by the letter R. The length of the legs 58b, 58b is such that electrical connection may be established between the four probes 60b, 60b and the four aforesaid contact elements 44a, 44a and 44b, 44b without opening the circuit between the contact elements. However, the interconnection between the probes 60b, 60b on each leg provides redundancy so that circuit continuity will be maintained and a tap circuit will be established even if one or both sets of the first and second contact elements are deflected to open circuit condition by insertion of the plugging element 56b.

Figure 14:
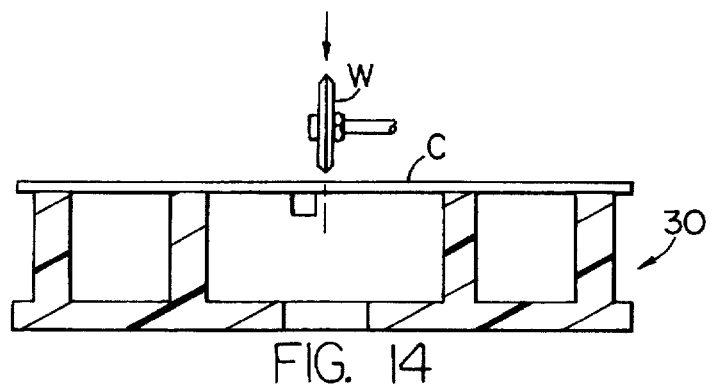
FIGS. 14 and 15 are somewhat schematic views illustrating steps in a method of making a cross-connect bus.
Figure 15:
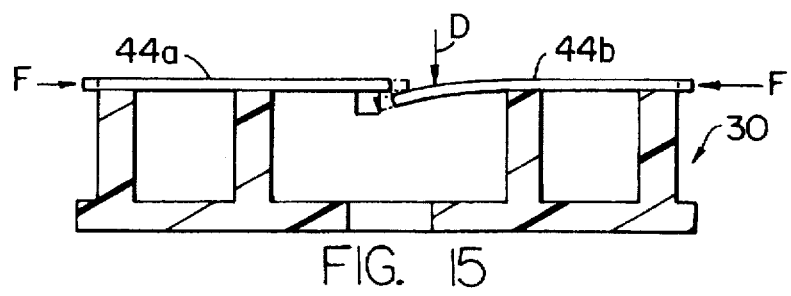

A method for making a cross-connect bus in accordance with the invention is illustrated somewhat schematically in FIGS. 14 and 15. Specifically, a cross-connect bus 10 is made by mounting opposite end portions of a rectilinear axially elongate resilient spring wire conductor C on a common support base and more particularly a support base 30 which includes spaced apart receptacles, such as previously described, and severing the wire conductor C generally midway between the receptacles to form the spring wire into two contact elements each having an outer end portion mounted on an associated receptacle and an inner end portion supported in cantilever position by the outer end portion and having a free end. A high speed grinding wheel W is preferably employed to sever the conductor C so that the burrs will not be produced on the free ends by the severing operation (FIG. 14).

After the step of severing the wire has been completed the free end portion of at least one of the resulting two contact elements is deflected out of axial alignment with the other of the free ends by applying an axially transverse deflecting force D to at least one of the contact elements. While the free ends are maintained in deflected position relative to each other at least one of the contact elements 44a, 44b is moved toward and relative the other of the contact elements by applying a force F to one or both of the outer ends of the contact elements 44a, 44b in the direction of the arrows ff shown in FIG. 15 to position the free ends in overlapping relation to each other. The deflecting force D is released after the free end portions have attained positions of overlapping relation.

I claim:

1. A method for making a cross-connect bus comprising the steps of mounting coaxially aligned opposite outer end portions of a rectilinear axially elongate resilient cylindrical spring wire conductor on a common support base, severing the resilient cylindrical spring wire conductor intermediate its opposite end portions to form from the conductor two separate resilient cylindrical spring wire contact elements each having a free inner end portion supported in cantilever position by an associated opposite outer end portion mounted on the support base, deflecting the free inner end portions of the contact elements in an axially transverse direction relative to each other to move the free inner end portions of the contact elements out of coaxial alignment with each other, and moving the outer end portion of at least one of the contact elements relative to the support base and in an axial direction toward and relative to the other of the contact elements while the free end portions are out of coaxial alignment with each other to bring the free end portions into generally overlapping relation to each other.

2. A method for making a cross-connect bus as set forth in claim 1 including the step of forming a support base having spaced apart receptacles and the step of mounting is further characterized as mounting the opposite outer end portions on the receptacles.

3. A method for making a cross-connect bus as set forth in claim 1 wherein the step of severing is further characterized as grinding.

4. A method for making a cross-connect bus as set forth in claim 1 wherein the step of deflecting is further characterized as applying an axially transverse deflecting force to at least one of the inner end portions.

5. A method for making a cross-connect bus as set forth in claim 1 wherein the step of moving is further characterized as applying an axially directed force to the opposite end of the at least one of the opposite outer end portion.

6. A method for making an electrical switching device comprising the steps of providing a unitary dielectric support base having a pair of spaced apart contact element mounting portions and a rectilinear axially elongated generally cylindrical spring wire conductor having opposite outer end portions, mounting each of said outer end portions in fixed position on an associated one of said mounting portions to position said rectilinear axially elongated resilient spring wire conductor on said support base and extending between said mounting portions and in bridging relation to the space between said mounting portions, severing the spring wire conductor intermediate its outer end portions and at a location within the space between said mounting portions to form from the conductor two separate contact elements each having a free inner-end portion supported in a cantilever position by an associated one of said mounting portions, deflecting the free inner end portion of at least one of the contact elements in an axially transverse direction relative to the inner-end portion of the other of the contact elements to move the free inner-end portions of the contact elements out of coaxial alignment with each other, and moving the outer-end portion of at least one of the contact elements relative to its associated mounting base and in an axial direction toward and relative to the other of the contact elements while the free end portions are out of coaxial alignment with each other to bring the free end portions into generally overlapping relation to each other.

* * * * *